(12) United States Patent
Hützen et al.

(10) Patent No.: US 12,409,898 B2
(45) Date of Patent: Sep. 9, 2025

(54) FUNCTIONALISED AND SEALED PART

(71) Applicant: Kautex Textron Gmbh & Co. KG, Bonn (DE)

(72) Inventors: Markus Hützen, Sankt Augustin (DE); Fabian Siggia, Cologne (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 297 days.

(21) Appl. No.: 17/909,531

(22) PCT Filed: Mar. 10, 2021

(86) PCT No.: PCT/EP2021/056033
§ 371 (c)(1),
(2) Date: Sep. 6, 2022

(87) PCT Pub. No.: WO2021/180778
PCT Pub. Date: Sep. 16, 2021

(65) Prior Publication Data
US 2023/0109931 A1    Apr. 13, 2023

(30) Foreign Application Priority Data

Mar. 12, 2020    (DE) .................... 102020106868.9

(51) Int. Cl.
*B29L 31/30* (2006.01)
*B29C 43/18* (2006.01)
(Continued)

(52) U.S. Cl.
CPC ............ *B62D 29/004* (2013.01); *B29C 43/18* (2013.01); *B29C 45/14336* (2013.01); *B62D 29/041* (2013.01); *B62D 29/043* (2013.01); *B29L 2031/3002* (2013.01); *B29L 2031/3014* (2013.01); *B29L 2031/3044* (2013.01);
(Continued)

(58) Field of Classification Search
None
See application file for complete search history.

(56) References Cited

U.S. PATENT DOCUMENTS 6,691,368 B1    2/2004 Zimmer
2002/0157775 A1    10/2002 Bauhoff
(Continued)

FOREIGN PATENT DOCUMENTS

DE    19927067 A1    12/2000
DE    102005012499 A1    9/2006
(Continued)

OTHER PUBLICATIONS

Machine Translation of ISA Written Opinion.*
Japan Office Action, dated Sep. 25, 2023 (5 pages).

*Primary Examiner* — Christopher T Schatz
(74) *Attorney, Agent, or Firm* — Occhiuti & Rohlicek LLP

(57) ABSTRACT

A component comprising a sheet-like reinforcing component having a first stiffness and a sheet-like attachment made of an attachment material having a second stiffness, wherein the first stiffness is higher than the second stiffness, wherein the planar reinforcing component has an upper and lower side and the attachment is connected at least to the upper or lower side of the planar reinforcing component in a first partial area of the planar reinforcing component.

11 Claims, 9 Drawing Sheets

(51) Int. Cl.
    *B29C 45/14*         (2006.01)
    *B62D 29/00*         (2006.01)
    *B62D 29/04*         (2006.01)
    *B29L 31/00*         (2006.01)

(52) U.S. Cl.
    CPC ......... *B29L 2031/7146* (2013.01); *B29L 2031/7172* (2013.01); *B29L 2031/771* (2013.01)

(56) References Cited

U.S. PATENT DOCUMENTS

| | | |
|---|---|---|
| 2002/0160145 A1 | 10/2002 | Bauhoff |
| 2006/0147672 A1* | 7/2006 | Ruiz .................. B29C 65/607 |
| | | 264/296 |
| 2008/0116701 A1 | 5/2008 | Boumaza et al. |
| 2009/0197146 A1 | 8/2009 | Nonogaki |
| 2014/0065472 A1 | 3/2014 | Naritomi |
| 2019/0144044 A1 | 5/2019 | Meskin |
| 2019/0283292 A1 | 9/2019 | Segi |
| 2021/0309304 A1* | 10/2021 | Mueller .............. B29C 45/0055 |

FOREIGN PATENT DOCUMENTS

| | | |
|---|---|---|
| DE | 102007006493 A1 | 8/2008 |
| DE | 112011103922 T5 | 9/2013 |
| DE | 102013213711 A1 | 1/2015 |
| DE | 202015102088 U1 | 7/2016 |
| DE | 102015209519 A1 | 11/2016 |
| EP | 1495947 A2 | 1/2005 |
| EP | 1970186 A2 | 9/2008 |
| EP | 2377703 A1 | 10/2011 |
| EP | 3539745 A1 | 9/2019 |
| JP | 2003260720 A | 9/2003 |
| JP | 2020516492 A | 6/2020 |
| JP | 2023503106 A | 1/2023 |
| WO | 2011095399 A1 | 8/2011 |
| WO | 2016125552 A1 | 8/2016 |
| WO | 2018189635 A1 | 10/2018 |
| WO | 2018211866 A1 | 11/2018 |

\* cited by examiner

FUNCTIONALISED AND SEALED PART

CROSS REFERENCE TO RELATED APPLICATIONS

This application is a 371 National Stage application of International Application No. PCT/EP2021/056033, filed Mar. 10, 2021, which claims the benefit of the filing date of German Application No. 10 2020 106 868.9, filed Mar. 12, 2020, the contents of which are hereby incorporated by reference in their entireties.

BACKGROUND

Fiber composites are increasingly being used in the automotive sector to reduce component weight and increase component performance. One approach for highly stressed injection-molded components is single-stage forming and back injection molding (so-called "in-mold forming") of thermoplastic, continuous-fiber-reinforced semifinished products (so-called organosheets). A similar procedure is also possible with the impact extrusion process. These technologies combine the outstanding mechanical properties of continuous fiber-reinforced fiber-reinforced plastics (FRP) with the high cost-effectiveness and possibility of functionalization by injection molding or impact extrusion. Existing product applications include front end module carriers, seat structures, door systems, vehicle underbody structure or underride protection but also fuel tank and battery housing systems.

It has been determined by the inventors that two problems can arise when using such semi-finished products that act as reinforcing components:

On the one hand, reinforcing components do not offer the possibility of welding, or organosheets usually have a matrix-poor edge layer (and high fiber content in the edge layer), which does not have good bonding capability in direct welding processes, e.g. hot plate welding."

On the other hand, during the production of the component, e.g. retaining holes can occur in the organosheet, or during transport/handling of the organosheets, breakthroughs in the organosheet can be caused by gripping tools such as needle grippers. This can be disadvantageous when using organosheets if these organosheets are later to be part of systems, e.g. fuel tank systems or battery housings, where the tightness of the system is necessary.

To solve this problem, a component and a method of manufacturing this component are provided, as defined in the appended claims.

DETAILED DESCRIPTION

The invention is directed to a component comprising a sheet-like reinforcing component (2) having a first stiffness and at least one sheet-like attachment (3) made of an attachment material having a second stiffness, wherein the first stiffness is higher than the second stiffness, wherein the sheet-like reinforcing component has an upper and lower side and the at least one attachment (3) is connected to the sheet-like reinforcing component (2) at least on the upper or lower side of the sheet-like reinforcing component (2) in a first partial area.

The attachment offers the advantage that additional components, such as functional components, can be mounted or welded onto it. Furthermore, the attachment offers the advantage that it can be used in existing openings, such as blind and non-blind holes in the planar reinforcing component for sealing the reinforcing component or further improved anchoring of the attachment in the reinforcing component.

"Planar" in the sense of the invention means that the object extends in a plane, and its vertical extent is very small compared to its horizontal extent. Flat objects have one or more narrow sides at the end of their horizontal extension, which are enclosed by the horizontally extending upper and lower sides.

Stiffness in the sense of the invention is extensional stiffness, shear stiffness, flexural stiffness and/or torsional stiffness. That the first stiffness is higher than the second stiffness means that the extensional stiffness, shear stiffness, bending stiffness and/or torsional stiffness of the planar reinforcing component is higher than the corresponding extensional stiffness (modulus of elasticity), shear stiffness, bending stiffness and/or torsional stiffness of the planar edge material. The first stiffness, expressed in particular as the strain stiffness (the modulus of elasticity), may be at least 2 times as high, 2 to 250 times, 3 to 200 times, or 20 to 100 times as high as the second stiffness, expressed in particular as the strain stiffness (modulus of elasticity).

The reinforcing component (2) can be a plastic, a fiber composite of thermoplastic or thermosetting type, a metal plate or a wooden plate.

Fiber-reinforced plastics consist of a matrix and reinforcing fibers.

The matrix can be a thermoplastic matrix (polyetheretherketone, PEEK; polyphenylene sulfide, PPS; polysulfone, PSU; polyetherimide, PEI; polytetrafluoroethene, PTFE; polyamide, e.g. PA6, PA66, PA612, or polyphthalamide, PPA; polyolefin, e.g. polyethylene, PE, or polypropylene, PP; or/and polycarbonate, PC), or a thermoset matrix (epoxy resin, EP, e.g. 2%; unsaturated polyester resin, UP, e.g. 8%; vinyl ester resin, VE; phenol formaldehyde resin, PF, e.g. 38%; diallyl phthalate resin, DAP; methacrylate resin, MMA; polyurethane, PUR; or/and amino resins).

Reinforcing fibers can be inorganic non-metallic reinforcing fibers (basalt fibers, boron fibers, glass fibers, ceramic fibers, silica fibers, carbon fibers, or/and quartz fibers), organic reinforcing fibers (aramid fibers, PBO fibers, polyester fibers, nylon fibers, polyethylene fibers, and/or polymethyl methacrylate fibers), and/or metallic reinforcing fibers (steel fibers).

Based on their length, the reinforcing fibers can be short fibers (0.1 to 1 mm), long fibers (1 to 50 mm), or continuous fibers (>50 mm). The latter are preferred because of the very high stiffness they impart. The arrangement of the reinforcing fibers can be woven or laid. The arrangement of the reinforcing fibers can also be single or multilayer.

The attachment material can be an injection molding material, in particular an injection molding material of thermoplastic type, or an impact extrusion material, in particular an impact extrusion material of thermoplastic or thermoset type. In particular, the attachment material may be a weldable edge material.

Injection molding material of thermoplastic type can be polyolefin (polypropylene, PP, polyethylene, PE), plexiglass, PMMA, polycarbonate, PC, polystyrene, PS, and its copolymers (e.g. ABS=acrylonitrile-butadiene-styrene), polyamide, PA, or polyoxymethylene.

The extruded thermoplastic material can be a Long Fibre Thermoplastic (LFT with glass fiber or carbon fiber), Direct Long Fibre Thermoplastic (D-LFT), Glass Mat Thermoplastic, GMT, or Carbon Fiber Reinforced Polymer, CFRP. The thermoset impact extrusion material can be Sheet Molding Compound (SMC with glass fiber or carbon fiber), Direct Sheet Molding Compound, D-SMC, or Bulk Molding Compound, BMC.

The component preferably consists of a flat reinforcing component made of a fiber composite plastic and an attachment made of an injection molding material or impact extrusion material.

The combination is particularly well suited for applying additional components to the reinforcing component or leads to very good sealing results.

The planar reinforcing component may have at least one aperture from the top to the bottom of the planar reinforcing component (2), wherein the at least one planar attachment (3) covers the at least one aperture.

During the component manufacturing process, certain gripping tools, such as needle grippers, can cause holes or punctures through the reinforcing component due to the production process. The attachment, which is applied to the reinforcing component by injection molding or impact extrusion, can seal these apertures to prevent fluids from passing through them. This can be achieved, on the one hand, by the attachment projecting beyond the edge of the aperture in an overlap area with the reinforcing component or/and by filling the aperture with the attachment material.

Therefore, a (continuous) attachment may also cover more than one aperture, preferably 2, 3, 4, 5, or 6 apertures. The attachment can be circular, square or cross-shaped in plan view.

The at least one planar attachment may include a fabric-engaged extension that fills the at least one aperture. This process can act as a plug to seal the opening.

The length of the area of overlap of the planar attachment with the planar reinforcing component can be at least 2.0 times, 2.5 times, 3.0 times, 3.5 times, or 4.0 times the wall thickness of the planar reinforcing component.

These lengths of the overlap area lead to particularly good adhesion of the attachment to the flat reinforcing component and thus also to a particularly good seal.

The length of the area of overlap of the at least one planar attachment with the planar reinforcing component may be at least 2.5 times, 3.0 times, 3.5 times, 4.0 times, or 4.5 times the diameter of the at least one aperture.

These lengths of the overlap area lead to particularly good adhesion of the attachment to the flat reinforcing component and thus also to a particularly good seal.

The at least one attachment may include a channel that is integrally connected to the at least one attachment and that connects the at least one attachment to the edge of the planar reinforcing component. The channel is applied to a second portion of the planar reinforcing component (2) that is not the same as the portion to which the at least one attachment is applied.

The channel can be made of the same edge material as the attachment. Preferably, the channel and attachment are applied to the reinforcing component in a single step.

During the manufacturing process, such a channel allows the add-on material to be fed to the reinforcing component through a hole in the mold in the edge area of the reinforcing component. This can reduce the number of holes in the mold when the attachment material is used to make components that are also attached to the reinforcing component, for example, in the edge region, although the attachment is spaced from the edge region of the reinforcing component. Alternatively, the tool has a hole for the respective attachment placed directly above the location of the reinforcing component to which the attachment is to be applied.

The diameter of the channel in plan view may be smaller than the diameter of the attachment in plan view.

This can reduce the use of the attachment material.

Alternatively, the attachment can also be attached in the edge area of the reinforcing component and be materially bonded without a channel to a component that can be attached in the edge area of the reinforcing component.

This arrangement is appropriate when the attachment is placed in the edge area of the reinforcing component and is directly adjacent to the component, which may be placed in the edge area of the reinforcing component.

The channel may be bifurcated at least once so that it divides into at least two subchannels starting at a branching point, and the subchannel of each bifurcation may be connected to a respective attachment.

This allows the use of the top material to be reduced during manufacture. Multiple bifurcations may also be provided in series one after the other so that multiple branching of the channels occurs.

The height of the at least one attachment can be 0.5 to 1.5 times the wall thickness of the flat reinforcing component (2).

This height has proven to be advantageous for the subsequent application of functional components by welding or the sealing of openings.

The component may comprise at least two attachments, wherein at least one of the at least two attachments is connected to the top surface of the planar reinforcing component in the first sub-region and at least one of the at least two attachments is connected to the bottom surface of the planar reinforcing component in the first or a further sub-region.

The invention also relates to a functional component comprising a component as described above and at least one functional component, wherein the at least one functional component is connected to the at least one attachment.

The functional component may include at least two functional components and at least two attachments as described above, wherein at least one of the at least two functional components is connected to the at least one attachment on the top surface of the planar reinforcing component and at least one of the at least two functional components is connected to the attachment on the bottom surface of the planar reinforcing component.

The functional component can be connected to the attachment by welding, riveting or gluing. Preferably, the functional component is connected to the attachment by welding.

The functional component may be a retaining device for another component of a tank, such as a clip, pump, valve device, nipple, or any functional component that may be provided for a fuel tank system or battery housing.

The invention also relates to a further functional component comprising a component having at least one aperture, as described above, and at least one second functional component, wherein the second functional component or a portion of a second functional component is provided in the aperture, and is sealed from the wall of the aperture by the attachment material of the attachment.

The second functional component can be a hose, feed-through or valve. The second functional component can also be provided on the same attachment as the first functional component.

The second functional component can be mounted both in the aperture and on the surface of the attachment and thus have features also of the first functional component.

The radius of the attachment at the contact point to the functional component can be at least 5 mm larger than the radius of the functional component at the contact point.

Furthermore, the invention is directed to a front end module support, a seat structure, a door system, vehicle underbody structure, underride protection, fuel tank housing, flat (structural) components for battery systems or batteries (e.g. cell module end plates) or battery housings comprising the component described above.

The invention also relates to a method of manufacturing a component as described above, comprising:
a. Providing the reinforcing component in at least a two-part form;
b. Placement of the attachment material in the mold;
c. Forming the component by injection molding or impact extrusion in the mold;
d. Removal of the obtained component from the opened-mold.

The invention also relates to a method of manufacturing a functional component as described above, comprising:
a. Providing a component described above;
b. Heat the attachment until it is in the plastic range;
c. Attaching a functional component to the attachment.

Alternatively, step b may involve applying an adhesive or step b may involve contacting the attachment with the functional component followed by riveting the functional component to the attachment.

A mold is understood here to be any suitable mold or tool that can accommodate the flat reinforcing component and, in the closed state, provides cavities around the reinforcing component into which the add-on material can be injected through channels (injection molding), or add-on material can be provided for compression (impact extrusion). In injection molding, the part can be removed after the solidification point of the add-on material has been reached. The cavities are designed to be able to give the edge material the design defined by the component described above.

Further, the component may also comprise a sheet-like edge material having a second stiffness, the composition of the edge material being the same as that of the top material, and wherein the reinforcing component has a first end at a first narrow side and the edge material has a second end divided into two strips at a second narrow side, and the two strips of the second end enclose the first end on both sides in an enclosing region. Alternatively, the second end has only one ledge that overlaps with the first end. In this case, the first end may have at least one indentation that allows to increase the interface between the first end and the second end compared to the case without indentation, thus increasing the stability of the cohesion.

Due to the two-sided enclosure of the flat reinforcing component by the flat edge material, the component offers the advantage that the stability of the composite of flat reinforcing component and edge material is maintained even when strong forces act on the composite. In particular, the component can better withstand forces acting vertically to the surface of the component. Such a component, which encloses the flat reinforcing component on both sides, is mechanically equally stable for a vertically acting force (for example, from inside or outside or in the case of overpressure and underpressure on opposite sides of the component) regardless of side or direction and is therefore stable depending on the direction of force.

In the present invention, the narrow side of the sheet-like edge material is formed by two strips extending parallel to each other along the length of the narrow side of the sheet-like edge material. Thus, the two strips can receive the end of the flat reinforcing component between them (e.g., without gaps, interlocking, and/or interlocking). The tops or bottoms of the sheet reinforcing component and the sheet edge material run in one plane or in several planes that are parallel to each other over the entire extent or part of the extent of the planes. Both the flat reinforcing components and the flat edge material can contain sections in which the upper and lower sides are curved.

In a horizontal arrangement, the component may have a) a sheet reinforcing component region, b) an enclosure region, and c) a base material region of the sheet edge material, in that order.

An enclosing region in the sense of the invention consists, in a horizontal arrangement, of i) an overlap region, that is, the region in which the laths overlap the planar reinforcing component in area, and ii) a ramp region adjacent to the overlap region in which there is no overlap. In the ramp area, the sheet-like edge material may have a wall thickness greater than the wall thickness of the sheet-like edge material in the base material area. The ramp area is located between the overlap area and the base area.

The wall thickness of the edge material in the overlap area is understood to be the wall thickness of a strip of the flat edge material. The wall thickness of the edge material outside the overlap area simply corresponds to the wall thickness of the flat edge material in this area.

The two strips of the planar edge material can have a mutually asymmetrical or symmetrical structure, with an imaginary plane through the horizontal center of the planar reinforcing component forming the mirror plane. Preferably, the structure is symmetrical. The end faces of both the first and second strips may be the same distance from a narrow face of the planar reinforcing component. This means that the end faces of the strips are arranged exactly on top of each other, or are offset from each other by only a small degree of 20%-0% or 10%-0%.

The planar edge material may be arcuate over the entire enclosure area (in cross-section, i.e., transverse to the extent of the surface of the edge material).

This has the advantage that the edge material is particularly thick in the overlap area, where the strongest forces occur under load. Furthermore, the arc-like course allows the wall thickness of the edge material to increase from the starting point of the arc on the side towards the base area of the edge material to the end point of the arc adjacent to the sheet reinforcing component, first slowly up to a maximum value and then continuously decreasing again. In this way, strongly offset transitions between the flat reinforcing component and the flat edge material are avoided, and the component is given additional stability, which prevents the component from disintegrating under load.

Arcuate in the sense of the invention may denote a continuous steady increase/decrease in the wall thickness of the edge material in the transition region, i.e. an actual arcuate shape. However, arc-like can mean that a shape is present which consists of several straight sections, whereby the transitions between the several straight sections are pronounced by an edge and/or are formed by an arc.

The wall thickness of the edge material may be maximum at the position where the first end forms a narrow side of the planar reinforcing component, that is, the surface of the edge material at the position where the first end forms a narrow side of the planar reinforcing component is the greatest distance from the opposite surface of the reinforcing component. The wall thickness of the edge material of one strip or both strips in each case can be equal to or greater than half the base material thickness at this position. In sum, therefore, the wall thicknesses of the edge material at this position in the strips can be equal to or greater than the base material thickness. By the position of the wall thickness of the edge material at which the first end forms a narrow side of the sheet-like reinforcing component, a position on the surface of the edge material from which a perpendicular can be dropped onto the enclosed first end of the narrow side of the sheet-like reinforcing component is designated, that is, the point at which the narrow side of the sheet-like reinforcing component meets the second end of the sheet-like edge material.

As a result, the wall thickness of the edge material, or strip, forming the edge material at this position is highest in the transition area between the planar reinforcing component and the planar edge material. This position is the one where the component is most likely to break under load. Therefore, the wall thickness of the edge material at this position counteracts fracture of the component.

Furthermore, the minimum wall thickness may be equal to or greater than the base material wall thickness, i.e., the wall thickness of the edge material outside the enclosure area.

Therefore, the wall thickness of the edge material at this position counteracts fracture of the component in a particularly advantageous way.

The base material wall thickness can be $\geq 0.8$ mm and $\leq 10$ mm, $\geq 1$ mm and $\leq 5$ mm, $\geq 1.5$ mm and $\leq 4.5$ mm, $\geq 2.0$ mm and $\leq 3.5$ mm, $\geq 2.0$ mm and $\leq 3$ mm, or $\geq 2.25$ mm and $\leq 2.75$ mm.

The ramp area can have a length of $\geq 1.5$ mm and $\leq 15$ mm, $\geq 1.5$ mm and $\leq 5.0$ mm, $\geq 2.0$ mm and $\leq 4.5$ mm, $\geq 2.5$ mm and $\leq 4.0$ mm, or $\geq 3.00$ mm and $\leq 3.50$ mm The length of the ramp area is defined as the distance between the starting point of the arc (on the side towards the base area of the edge material) and the point at which a perpendicular is dropped from the position where the wall thickness of the edge material in the arc is maximum to the imaginary extension of the surface of the flat edge material in the base area.

The overlap region may have a length of $\geq 1.5$ mm and $\leq 15$ mm, $\geq 5.0$ mm and $\leq 15.0$ mm, $\geq 7.0$ mm and $\leq 12.0$ mm, $\geq 8.0$ mm and $\leq 11.0$ mm, or $\geq 9.00$ mm and $\leq 10.00$ mm The maximum wall thickness can be 0.5 times to 2 times, 1 times to 2 times, 1 times to 1.75 times, 1 times to 1.5 times, or 1 times to 1.25 times the base material wall thickness.

The length of the overlap area between the reinforcing component and the edge material can be 0.5 to 10 times, 1.5 to 8 times, 1.7 to 6 times, or 2 to 4 times the base material wall thickness.

It has been shown that this ratio between the length of the overlap area and the edge material ensures particularly high stability of the component.

Indentations (i.e., recesses or recesses) may be provided in the face of at least one of the strips.

These indentations can be made by hold-downs provided in the mold or die used to make the component. Hold-downs can reduce or prevent displacement or "splicing" (e.g. loosening of the bond between the fabric layers in the case of an organosheet) of the reinforcing component by the oncoming (plastic) melt and stabilize the flat reinforcing component against the melt flow or the pressed-on edge material, so that it is ideally held centrally to the wall thickness (or this is not pressed to the edge area of the wall on one side).

By the end faces of the battens is meant the sides of the battens that face the flat reinforcing component and are in the overlap area. Therefore, the indentations protrude into the strips from the face of the strips at an angle of 80° to 100°, preferably 90°.

Indentations may be provided in both strips.

This offers the advantage of largely symmetrical stabilization of the two-dimensional reinforcing component relative to the melt stream or the pressed-on edge material during the manufacturing process.

The indentations of the first strip may be arranged opposite the indentations of the second strip.

Thus, the respective indentations in the two strips are directly above each other.

This offers the advantage of very symmetrical stabilization of the two-dimensional reinforcing component relative to the melt flow or the pressed-on edge material during the manufacturing process.

The indentations may have two different lengths and the indentations with two different lengths may be arranged alternately.

In particular, a first set of indentations having one length and a second set of indentations having a second length may be present in one of the strips, the first length being greater than the second length.

In both the first and second bars, this first group and this second group of indentations may be present.

The indentations of the second set of indentations in the first bar may face the indentations of the first set in the second bar; and the indentations of the first set of indentations in the first bar may face the indentations of the second set in the second bar. As a result, the length of the indentations alternates both within a strip and between strips.

This arrangement has the advantage that the finished component is particularly tight against the fluid when used, for example, in a fluid container. Furthermore, a visible weld line is avoided.

Alternatively, the indentations of the second set of indentations in the first bar may face the indentations of the second set in the second bar; and the indentations of the first set of indentations in the first bar may face the indentations of the first set in the second bar. As a result, the length of the indentations only alternates within the respective bar.

This may have the advantage of providing an improved seal against fluid, but the manufacturing process is relatively simple due to the simpler mold required to produce this embodiment.

The indentations can have a length of 100% to 25% of the length of the overlap area. Preferably, the indentations may be provided with a length of 95% to 70% of the length of the overlap area, and/or indentations may be provided with a length of 25% to 50% of the length of the overlap area (in particular, these different lengths may be combined if two groups of indentations with different lengths are provided).

Furthermore, the indentations within one strip or within both strips can be approximately equi-distant to each other (approximately means up to 25% deviation of the distance between all indentations around an average value of the distance). In particular, the distances between the indentations in both strips can be approximately the same. However, it is also disclosed that, depending on the design specifications, the distances between the indentations within one or both battens can be freely adjusted, or are variable, at least in a partial area of the respective batten (for example, up to 30%).

The equidistance further improves pressure distribution under load.

The reinforcing component can be made of a plastic that is compatible with the plastic of the sheet-like edge material, so that a material bond can result between the reinforcing component and the sheet-like edge material. Furthermore, the reinforcing component may be made of an edge material that is compatible with the plastic of the sheet-like edge material, but may be coated with a plastic at least at the points where the reinforcing component comes into contact with the sheet-like edge material, or in its entirety, so that a material bond may again result between the reinforcing component and the sheet-like edge material (in this case, the stiffness of the coated reinforcing component corresponds to the stiffness of the uncoated reinforcing component). In addition, however, a form fit can also result.

Further, the reinforcing component may be made of an edge material that is incompatible with the plastic of the sheet-like edge material, so that a positive connection may result between the reinforcing component and the sheet-like edge material.

The choice of edge material and reinforcing component depends on the desired application, and the skilled person can select materials and reinforcing components according to the application. It is only essential that the stiffness of the reinforcing component is higher than the stiffness of the edge material.

The strips of planar edge material may completely enclose an edge that includes the entirety of the first narrow side of the reinforcing component. Alternatively, the flat edge material can also only partially enclose this edge, e.g. only one end face of the reinforcing component, that areas of the edge/narrow side of the reinforcing component remain free.

Thus, the entire circumferential edge of the reinforcing component is stabilized by the flat edge material.

EXAMPLE

In the description that now follows, identical reference signs designate identical components or identical components, respectively, so that a description carried out in relation to one figure with respect to a component also applies to the other figures, thus avoiding a repetitive description. Furthermore, individual features described in connection with one embodiment can also be used separately in other embodiments.

Figure 1:
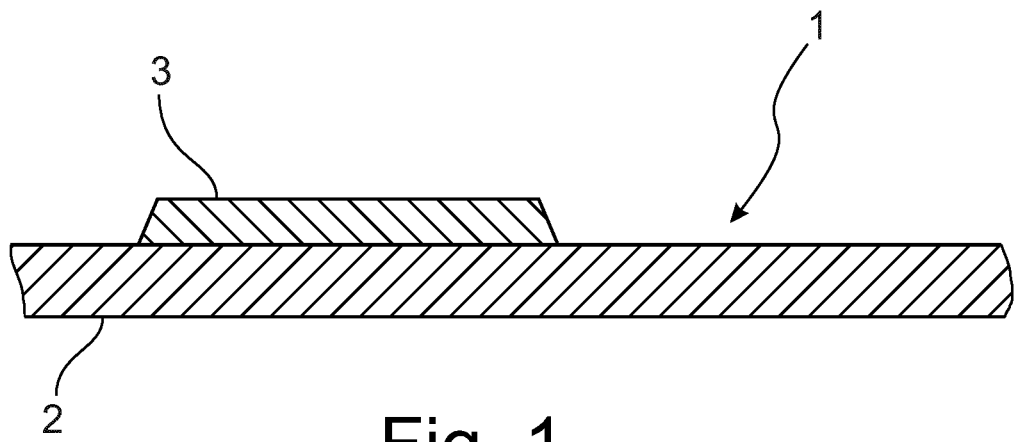
FIG. 1 illustrates the component according to the invention in a cross-sectional view.

FIG. 1 illustrates the component 1 according to the invention in a cross-sectional view.

The attachment 3 rests on the reinforcing component 2 in a partial area and is firmly connected to it.

Figure 2:
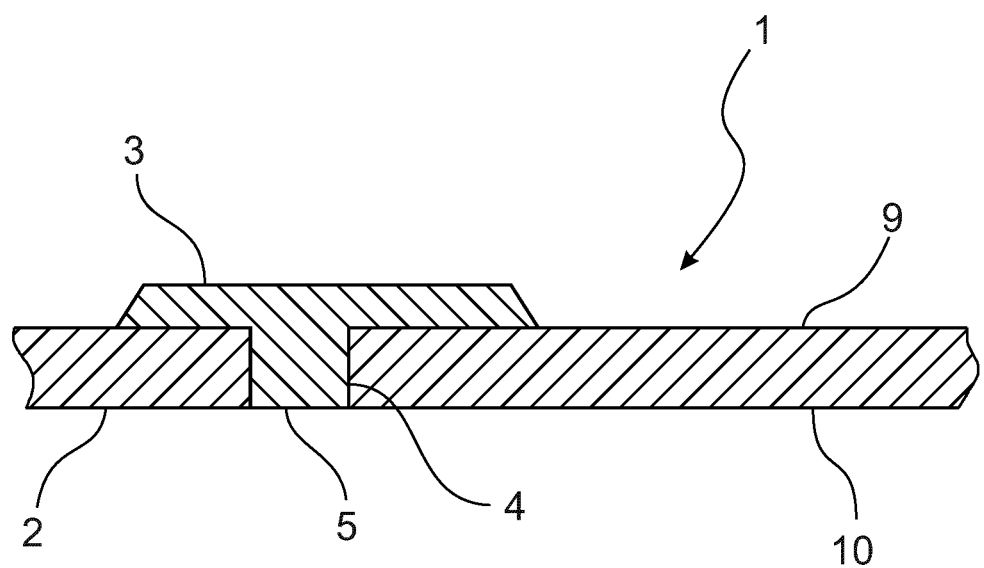
FIG. 2 illustrates the component according to the invention in a cross-sectional view.

FIG. 2 illustrates the component according to the invention in a cross-sectional view.

As shown in FIG. 2, the reinforcing component 2 may have an aperture 4 and the attachment 3 may have an extension 5 that sealingly fills the aperture 4 and thus seals against fluid that may pass from the top 9 to the bottom 10 (or vice versa). The attachment 4 also has a sealing effect at the contact surface to the upper side 9. Alternatively, it may be provided that the attachment 3 does not contain an extension and only has a sealing effect by bonding to the contact surface of the upper side 9 (not shown).

Figure 3:
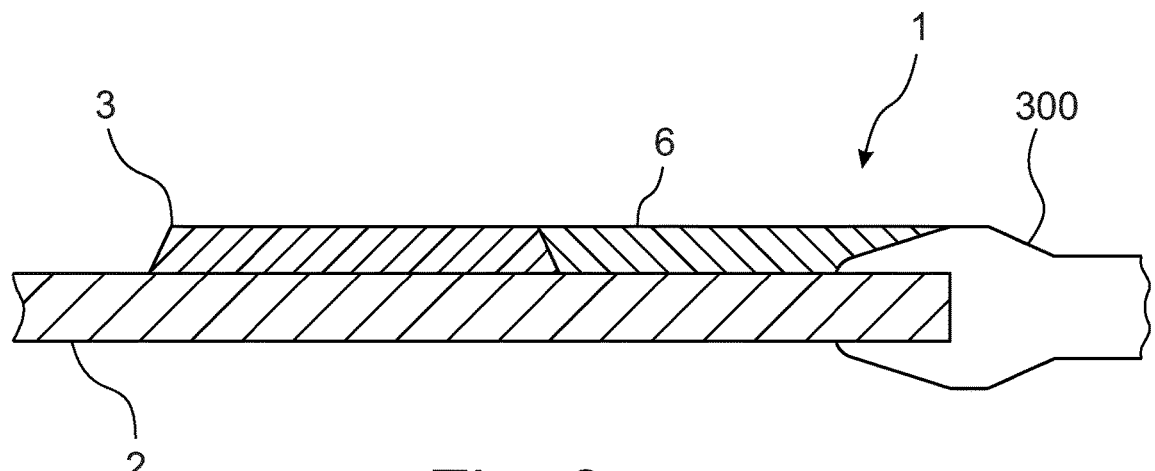
FIG. 3 illustrates the component according to the invention in a cross-sectional view.

FIG. 3 illustrates the component according to the invention in a cross-sectional view, in which a channel 6 is also provided.

The channel 6 connects the attachment 3 to an edge region of the reinforcing component 2 or optionally to a flat edge material, the structure of which is explained further below.

Figure 4:
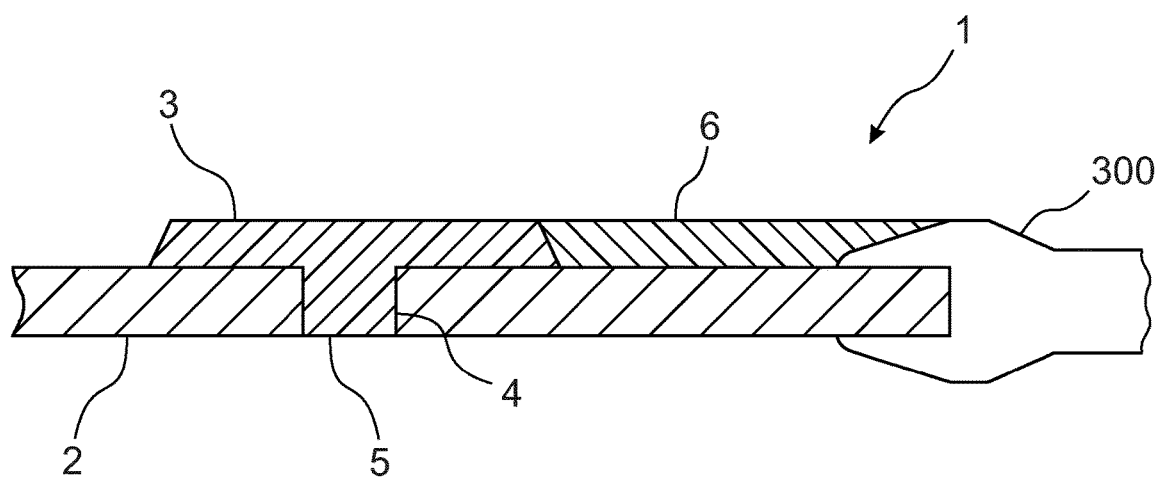
FIG. 4 illustrates the component according to the invention in a cross-sectional view.

FIG. 4 illustrates the component according to the invention in a cross-sectional view, in which the channel 6 and the aperture 4 are provided.

Figure 5:
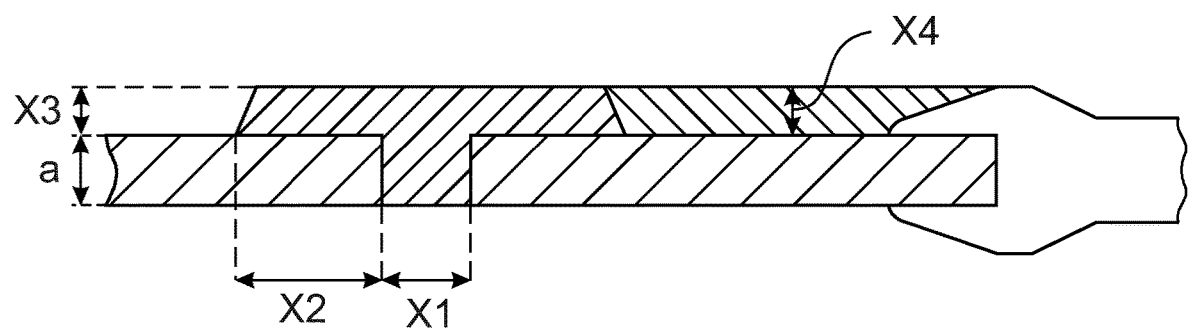
FIG. 5 illustrates the component of FIG. 4 according to the invention with additional reference signs.

FIG. 5 illustrates the component of FIG. 4 according to the invention with additional elements. For simplification, the reference signs in FIG. 4 have been omitted.

Here, X1 denotes the width of the breakthrough, X2 the overlap length of the attachment with the reinforcing component, X3 the height of the attachment, and a the height/thickness of the reinforcing component (also called the base material thickness).

The width X1 of the opening 4 corresponds to the width X1 of the opening at its widest point. The overlap length X2 of the attachment 3 with the reinforcing component is understood as the shortest distance lying on the straight line parallel to the top of the reinforcing component, starting from the center of the breakthrough to the edge of the attachment 3, and bounded by the intersection points of the straight line with the edge of the attachment 3 and the edge of the breakthrough.

The height X3 of the attachment is measured orthogonally to the top 10 of the reinforcing element, the height being determined at the center of the attachment 3.

The height/thickness a of the reinforcing component corresponds to the thickness or average thickness of the reinforcing component.

The height X4 of the channel corresponds to 30-100%, 50-100% or 80-100% of the height a of the gain component.

Figure 6:
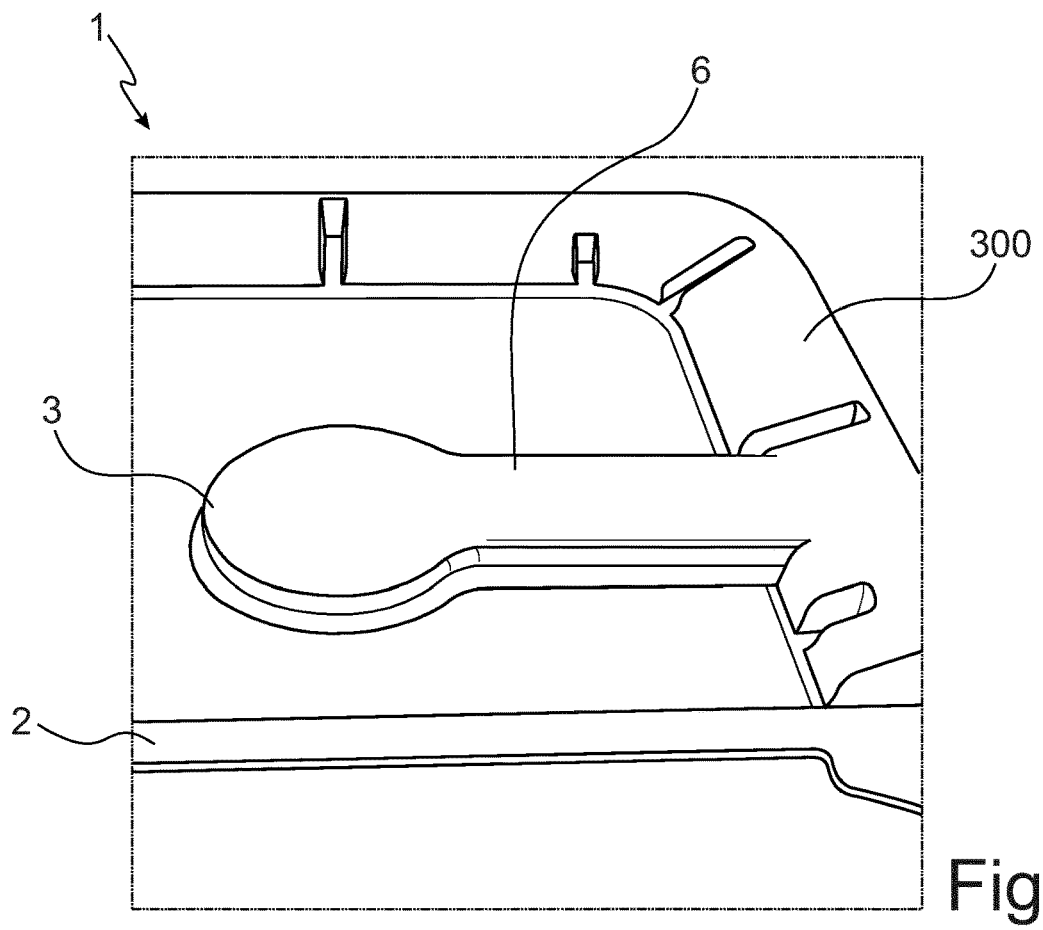
FIG. 6 illustrates the component according to the invention in a plan view.

FIG. 6 illustrates the component according to the invention in a plan view.

The attachment 3 may be connected to the planar wall material 300 via a channel 6. The channel 6 may be narrower than the diameter of the attachment 3 at its widest point.

Figure 7:
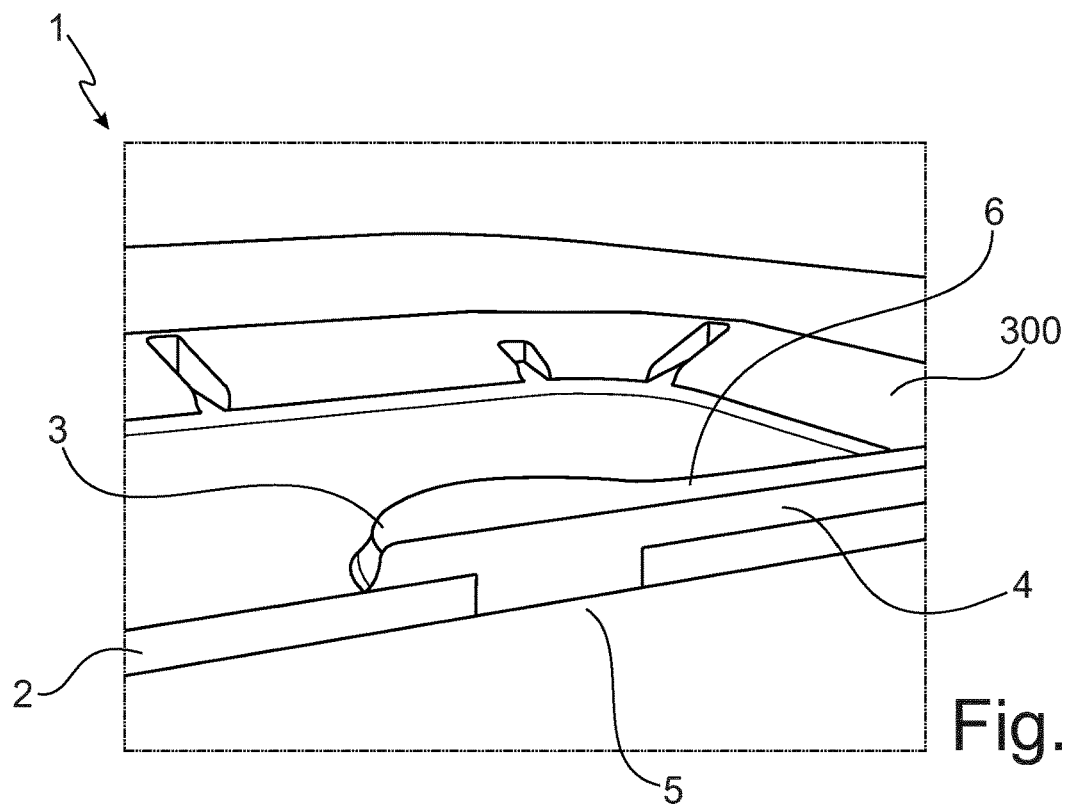
FIG. 7 illustrates the component according to the invention in a plan view.

FIG. 7 illustrates the component according to the invention in a plan view and in cross-section.

The extension 5 of the attachment 3 fills the opening 4.

Figure 8:
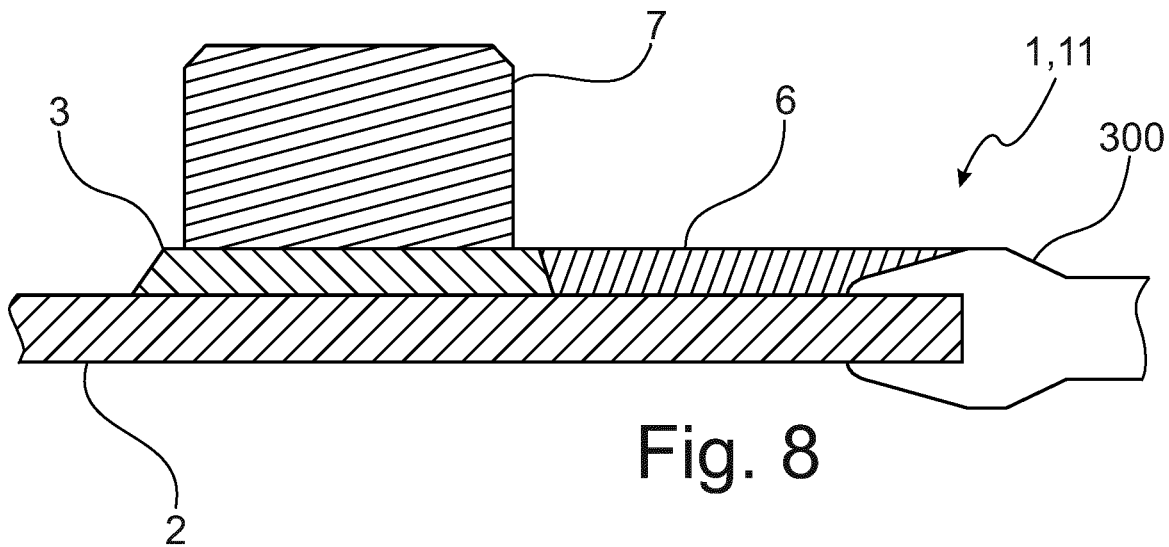
FIG. 8 illustrates the functional component according to the invention in cross-sectional view.

FIG. 8 illustrates the functional component according to the invention in cross-sectional view.

This FIG. 8 differs from FIG. 3 only in the functional component 7 applied to the attachment 3. Attachment 3 improves the connection of functional component 7 to reinforcing component 2 because it contains more weldable components than the reinforcing component.

Figure 9:
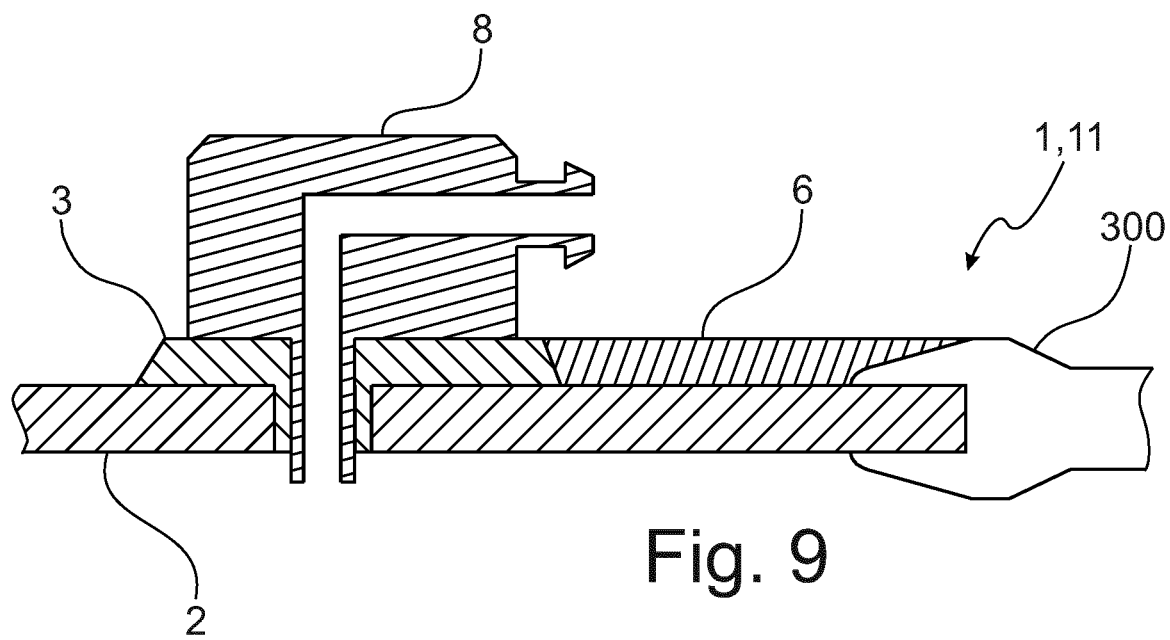
FIG. 9 illustrates the functional component according to the invention in cross-sectional view.

FIG. 9 illustrates the functional component according to the invention in cross-sectional view. In contrast to FIG. 8, here the reinforcing component 2 also has an aperture 4. The aperture is used in FIG. 9 to pass a functional component from the top 9 to the bottom 10. For example, a channel can be passed through the extension 5, which in turn is sealed off from the edge of the aperture 4.

Figure 10:
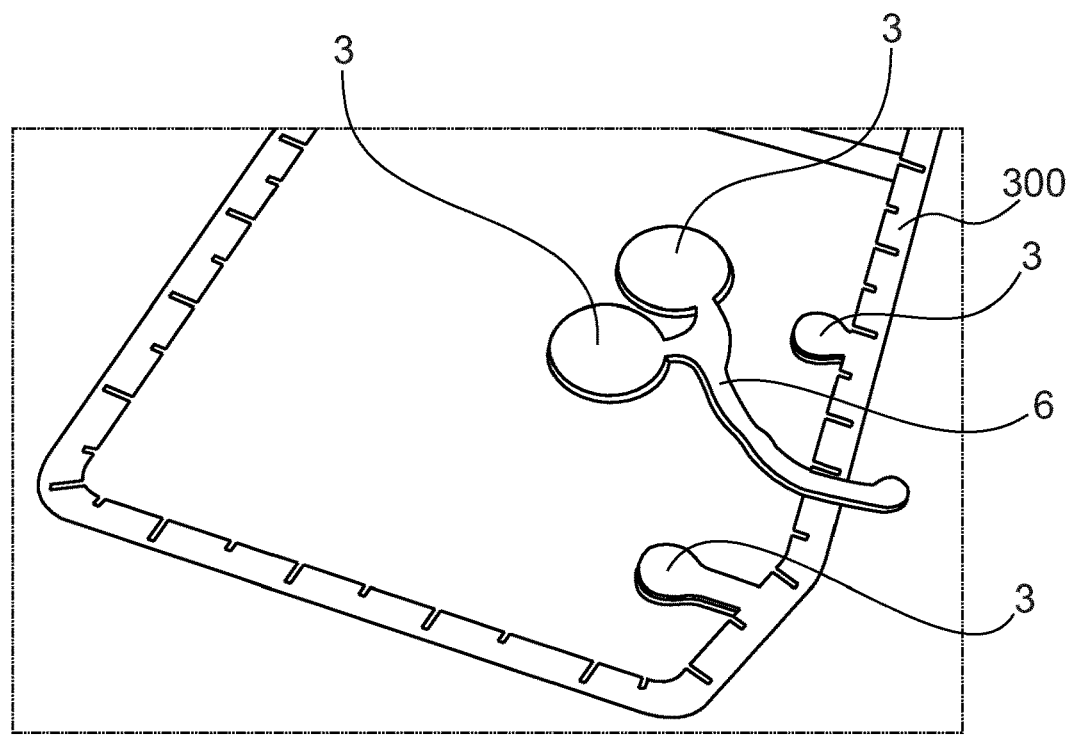
FIG. 10 illustrates the functional component according to the invention in a plan view.

FIG. 10 illustrates the component according to the invention in a plan view before the attachment of a functional component 7, 8. As can be seen, the component may be connected to the planar edge material 300 via channels 6 (attachments 6 in the lower and middle halves of FIG. 10). These channels 6 can bifurcate into subchannels, which in turn are connected to the attachments 3 (attachments 6 in the center of FIG. 10). Alternatively, the attachment 3 may be connected to the edge material 300 without a channel and thus be directly adjacent to it (attachment 6 in the upper right half of FIG. 10).

Figure 11:
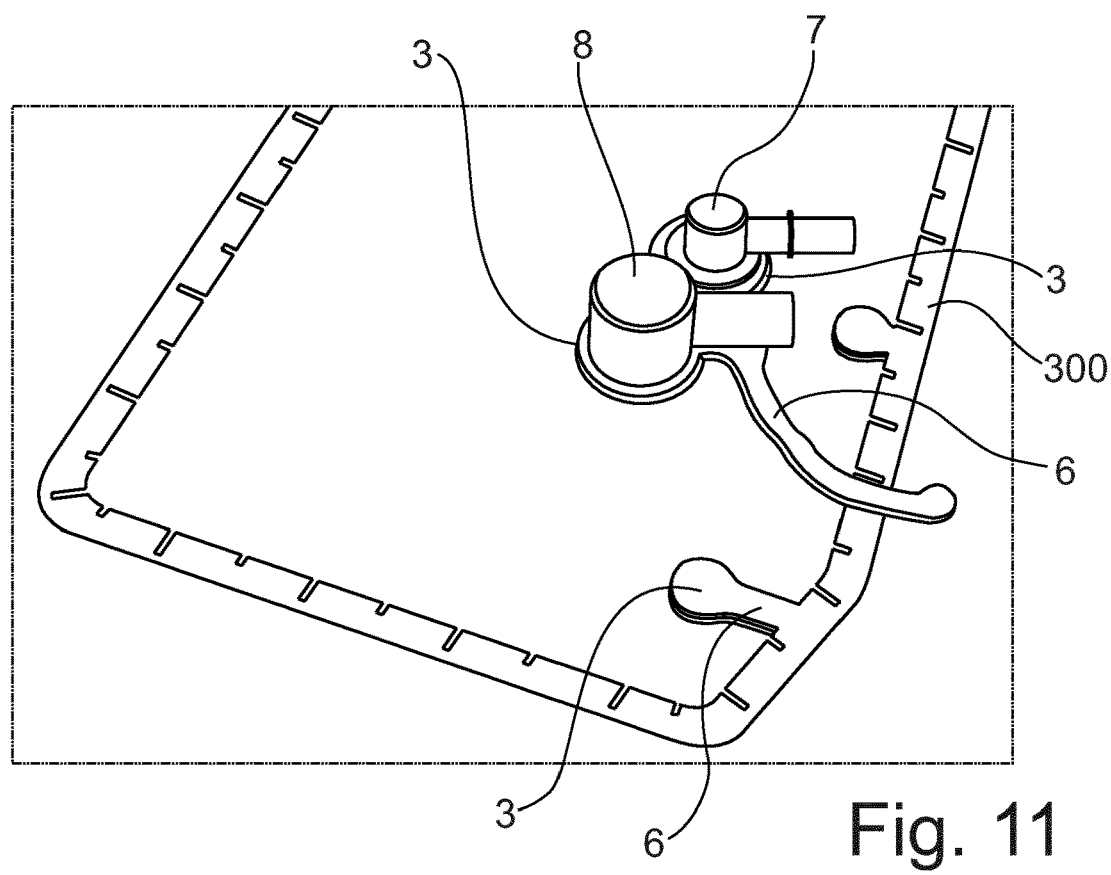
FIG. 11 illustrates the functional component according to the invention in a plan view.

FIG. 11 illustrates the functional component according to the invention in a plan view and differs from the representation in FIG. 10 by the attached functional components 7, 8.

Figure 12:
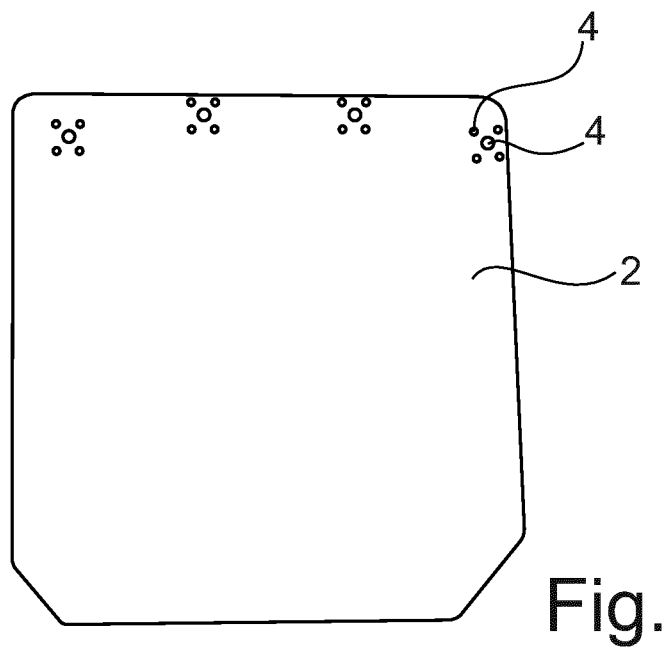
FIG. 12 illustrates the reinforcing component of the component according to the invention in a plan view.

FIG. 12 illustrates the reinforcing component of the component according to the invention in a plan view.

Several apertures 4 can be seen in the reinforcing component 2, which were created, for example, by gripping tools such as needle grippers.

Figure 13:
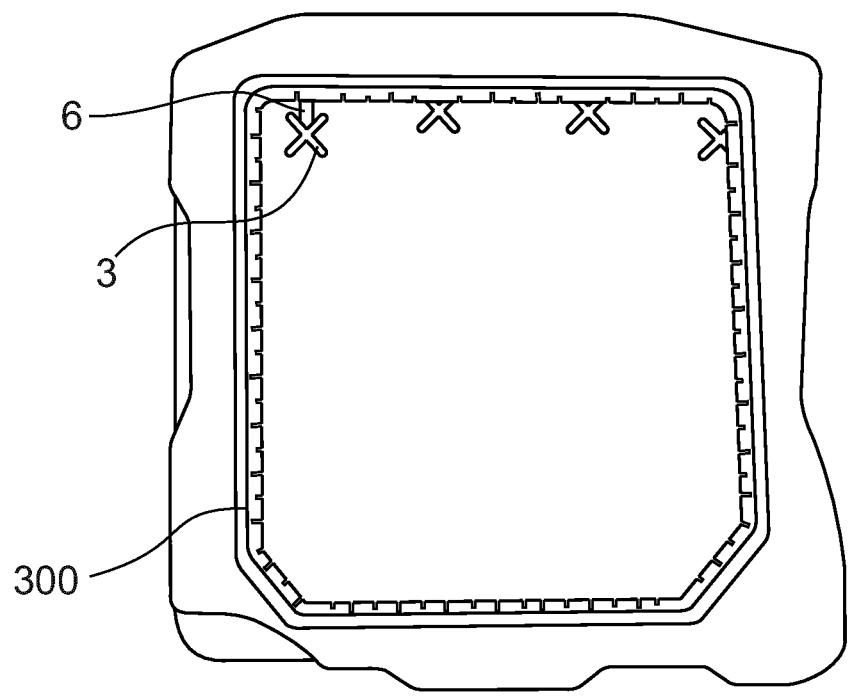
FIG. 13 illustrates the component according to the invention with the reinforcing component from FIG. 12 in a plan view.

FIG. 13 shows the reinforcing component 2 from FIG. 12 with four attachments 3 in the upper part of the figure. Furthermore, the edge of the reinforcing component 2 is comprised with an edge material 300 that is connected to the attachments 3. The attachments are used to close and thus seal the apertures 4. In the present case, the apertures were sealed by an attachment in the shape of a cross, in which the legs of the cross seal the apertures.

Figure 14:
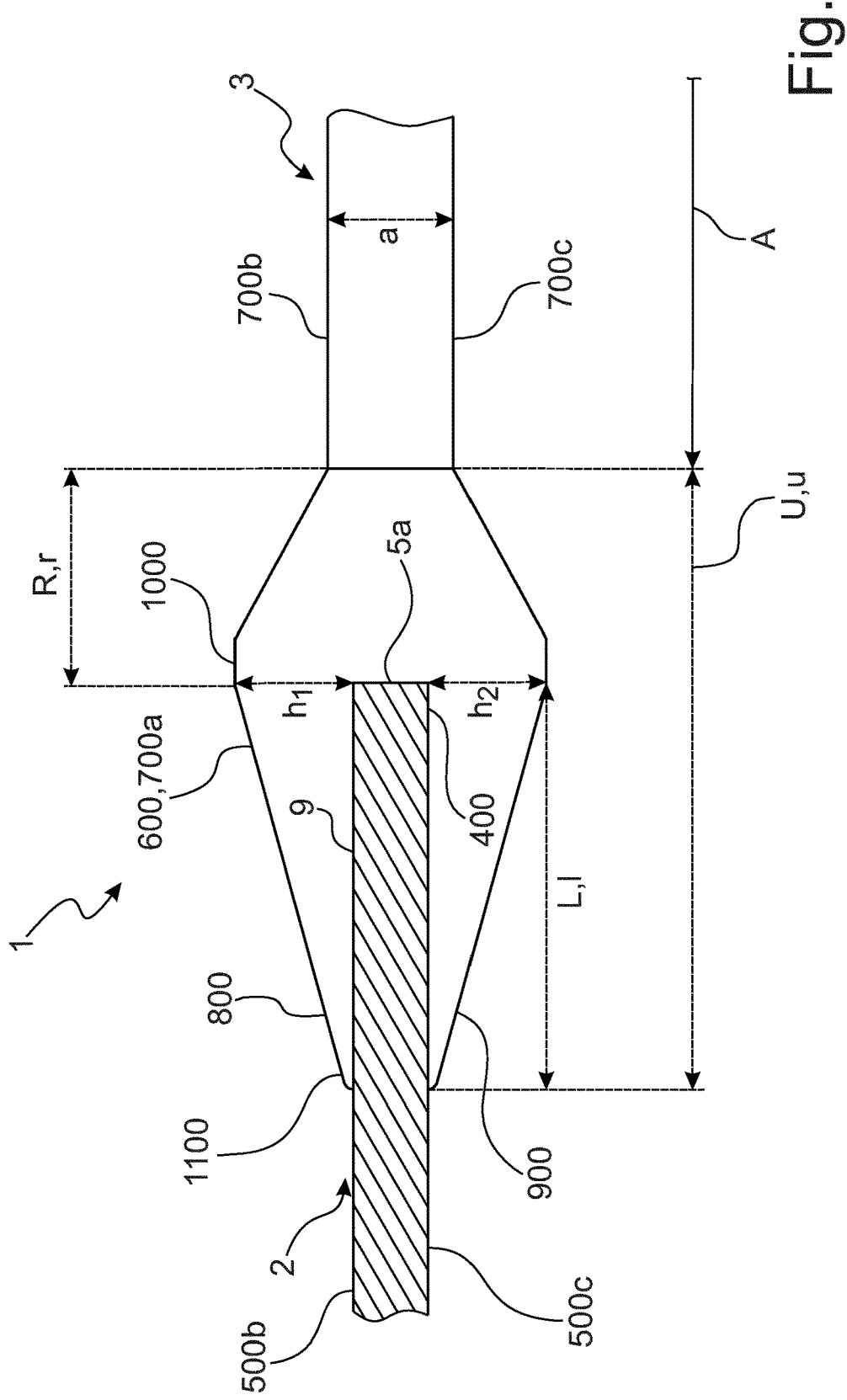
FIG. 14 illustrates the edge region of the component according to the invention in a cross-sectional view.

FIG. 14 illustrates the edge region of the component according to the invention in a cross-sectional view.

The component 1 includes a reinforcing component 2, which is two-dimensional and has a high degree of rigidity. Fiber composites of a thermoplastic or thermoset nature, as well as metal plates and other sheets, come into question here.

The reinforcing component 2 has a narrow side 500*a* at a first end 400 (shown on the right side in FIG. 1), which is bounded by a top side 500*b* and bottom side 500*c*. The opposite end of the gain component is not shown in the picture.

This reinforcing component 2 is overmolded on both sides with a less rigid (injection-molded) edge material 300 in an enclosing region U of length u. This edge material 300 is also largely planar in appearance. As a result of the overmolding on both sides, the edge material 300 forms two strips 800, 900 of the edge material 300 at a second end 600 (in FIG. 14 on the left side of the edge material 300), which lie against the reinforcing component 2 in an overlap region L (directly, i.e. without cavity formation). The opposite end of the edge material 300 is not shown in the picture. An illustration of the edge material 300 with the two strips 800, 900 without the reinforcing component 2 can be found in FIG. 16. It can be seen in FIGS. 15 and 16 that the two strips are located one above the other on the narrow side of the edge material 300, and project approximately the same distance above the reinforcing component 2.

The enclosing region U comprises the region in which the edge material 300 initially thickens in a ramp region R with respect to a base material region A and starting therefrom, but does not yet overlap with the reinforcing plate, and an overlapping region L in which the edge material 300 overlaps with the reinforcing plate.

The sheet-like edge material 300 may extend in an arc-like manner over the entire enclosure area U (in cross-section, i.e., transverse to the extent of the surface of the edge material 300), as shown in FIG. 14.

Arc-like in the sense of the invention may denote a continuous steady increase/decrease in the wall thickness of the edge material 300 in the enclosing region U, i.e. an actual arc shape. However, arc-like (or arcuate) can mean that there is a shape consisting of a plurality of straight sections, where the transitions between the plurality of straight sections are angular and/or formed by an arc, as shown in FIG. 14.

In particular, the highest wall thickness $h_1$, $h_2$ of the edge material 300 or the strips 800, 900 may be in the region above the interface of the reinforcing component 2 and the edge material 300. Therefore, the wall thickness $h_1$, $h_2$ of the edge material 300 may be maximum at the position where the first end 400 forms a narrow side 500*a* of the planar reinforcing component 2. At this position, where the first end 400 forms a narrow side 500*a* of the planar reinforcing component 2, the surface (upper side 700*b* or lower side 700*c*) of the edge material 300 has the greatest distance to the opposite surface (upper side 500*b* or lower side 500*c*) of the reinforcing component 2.

As a result, the wall thickness $h_1$, $h_2$ of the edge material 300, or of the strip 800, 900, of the strips 800, 900, which forms the edge material 300 at this position, is highest in the transition region between the sheet-like reinforcing component 2 and the sheet-like edge material 300 ("maximum wall thickness"). This position is the one at which component 1 is most likely to break under load. Therefore, the wall thickness of the edge material 300 at this position is particularly effective in counteracting breakage of the component 1.

Furthermore, this maximum wall thickness $h_1$, $h_2$ is equal to or greater than the base material wall thickness ½ a, that is, the wall thickness of the edge material 300 outside the enclosure region U.

Therefore, the wall thickness $h_1$, $h_2$ of the edge material 300 at this position counteracts fracture of the component 1 in a particularly advantageous manner Furthermore, this ensures that the wall thickness also in the transition region, i.e. the region where the narrow side 500*a* of the reinforcing component meets flat edge material 300, is at least equal to the wall thickness ½ a in the base material region A, and therefore the strength in this region is approximately the same as that found in the rest of component 1.

The length of the overlap area L is, for example, 2 to 4 times the base material wall thickness a.

It has been found that this ratio between the length of the overlap area L and the edge material 300 ensures a particularly high stability of the component 1, while at the same time avoiding excessive use of the edge material 300.

Figure 15:
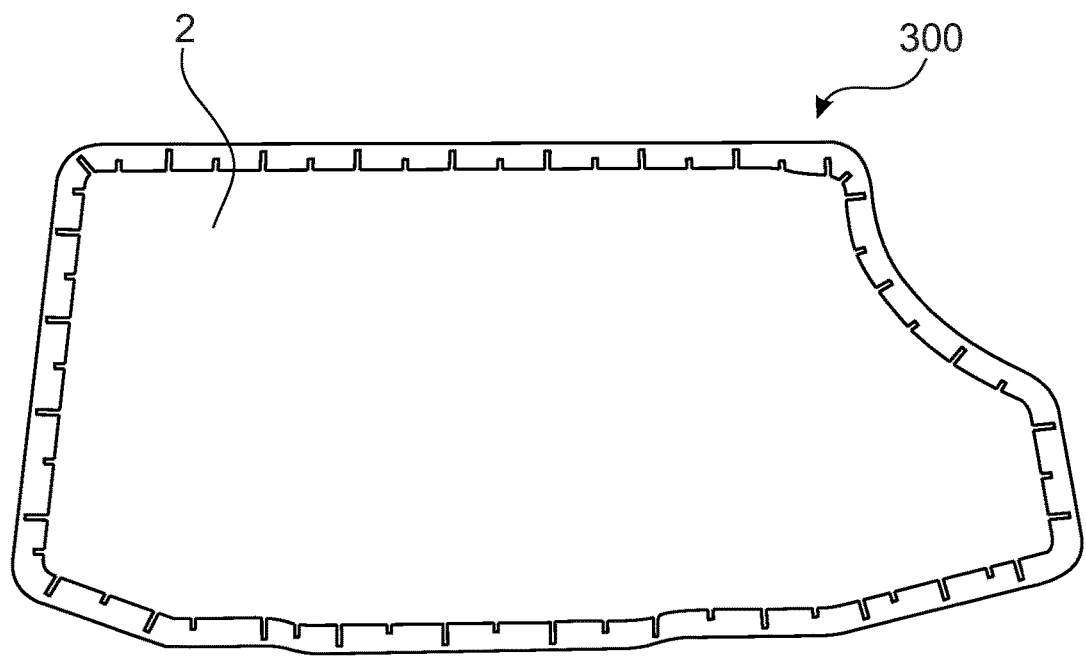
FIG. 15 illustrates the edge region of the component according to the invention in a plan view.
Figure 16:
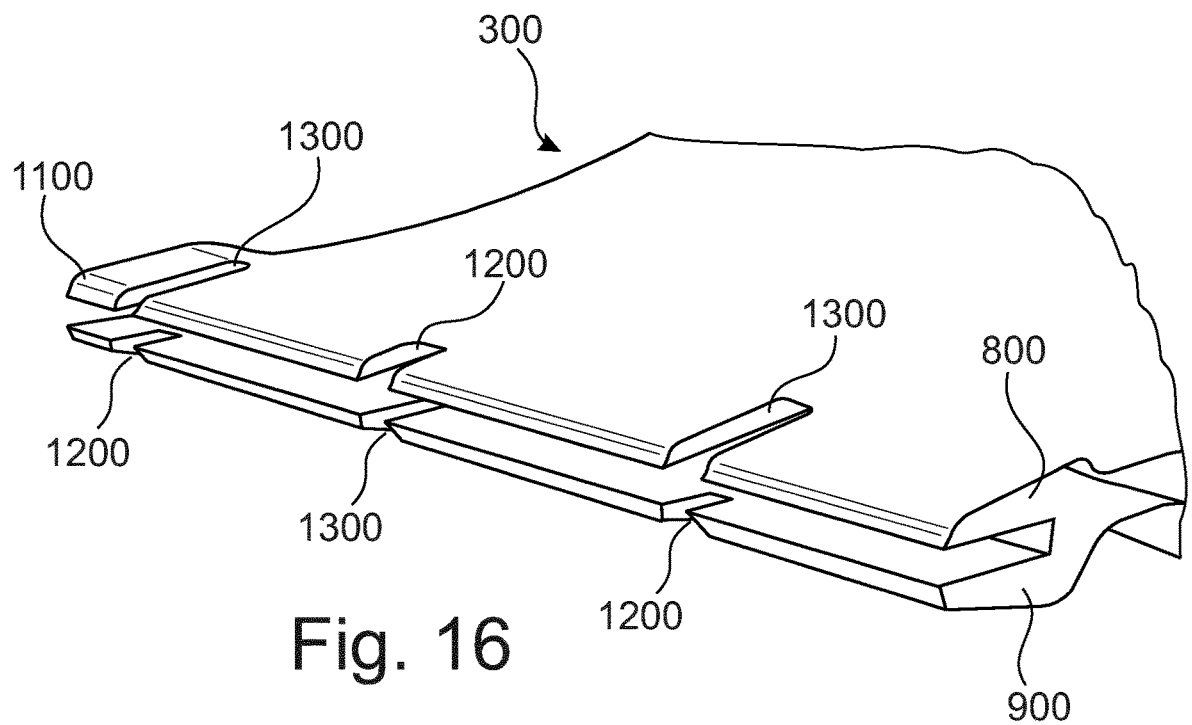
FIG. 16 illustrates the flat edge material of the component according to the invention in a perspective view in which indentations are visible.

FIG. 15 illustrates the component 1 according to the invention in a plan view and FIG. 16 shows a detailed perspective view of the edge material 300 from FIG. 15.

As can be seen from FIGS. 15 and 16, indentations 1200, 1300 (i.e., recesses, recesses) may be provided on the face 1100 of the strips 800, 900 from the overlap region.

These indentations 1200, 1300 can be made by hold-downs provided in the mold or tool used to make the component 1. Hold-downs can reduce or prevent displacement or "splicing" (e.g. loosening of the bond between the fabric layers in the case of an organosheet) of the reinforcing component 2 by the oncoming (plastic) melt the pressed-on edge material and stabilize the flat reinforcing component 2 against the melt flow so that it is ideally held centrally to the wall thickness of the edge material (or this is not pressed to the edge region of the wall on one side).

In the FIG. 300, indentations 1200, 1300 are provided in both strips 800, 900.

This offers the advantage of largely symmetrical stabilization of the two-dimensional reinforcing component 2 with respect to the melt flow during the manufacturing process.

As shown in FIG. 16 by way of example, the indentations 1200, 1300 of the first strip 800 may be arranged opposite the indentations of the second strip 900.

Thus, in the two strips 800, 900, the respective indentations 1200, 1300 are directly above each other.

This offers the advantage of very symmetrical stabilization of the two-dimensional reinforcing component 2 relative to the melt stream or the pressed edge material during the manufacturing process.

As shown in FIGS. 15 and 16, the indentations 1200, 1300 may have two different lengths and the indentations 1200, 1300 may alternate with two different lengths. Here, an indentation 1300 with a long length in the upper ledge 800, as in the indentations arranged on the left and right in FIG. 300, may be opposite an indentation 1200 with a short length in the ledge 900 below. Accordingly, an indentation 1200 having a short length in the upper ledge 800, as in the indentation 1200 centered in FIG. 300, may be opposed by an indentation 1300 having a long length in the ledge 900 below.

This arrangement has the advantage that the finished component 1 is particularly tight against the fluid when used, for example, in a fluid container. Furthermore, a visible weld line is avoided.

As shown in FIG. 15, the edge material 300 may completely surround the narrow side 500a of a planar reinforcing component 2. However, it is also conceivable that the edge material 300 is only attached to one or more partial areas of the planar reinforcing component 2.

LIST OF REFERENCE SIGNS

1: Component
2: (two-dimensional) reinforcing component
3: Attachment
4: Breakthrough
5: Extension
6: Channel
7,8: Functional component
9: Top side of the reinforcing component
10: Underside of the reinforcing component
11: Functional component
X1: Breakthrough width
X2: Overlap length of the attachment with the reinforcing component
X3: Attachment height
a: Height/thickness of the reinforcing component/base material thickness
300: (flat) edge material
400: first end of the flat reinforcing component
500a: Narrow side of the flat reinforcing component
500b: Top side of the flat reinforcing component
500c: Underside of the flat reinforcing component
600: second end of flat edge material
700a: Narrow side of the flat edge material
700b: Top side of the flat edge material
700c: Underside of the flat edge material
800: first bar
900: second bar
1000: Position of the maximum wall thickness of the edge material
1100: Front side of the overlap area
1200: Indentation, short
1300: Indentation, long
U, u: Enclosure area, length of the enclosure area
R, r: Ramp area
A: Basic material range
L, l: Overlap area, length of the overlap area
$h_1$: Wall thickness of the first bar
h 2: Wall thickness of the second bar

The invention claimed is:

1. A component suitable for at least one of:
a front end module support,
a seat structure,
a door system,
a fuel tank housing,
a vehicle underbody structure,
an underride guard, or
a structural component for battery systems or a battery housing,
the component comprising a planar reinforcing component having a first stiffness and at least one planar attachment made of an attachment material having a second stiffness, the first stiffness being higher than the second stiffness, wherein the planar reinforcing component has an upper and lower side and the at least one planar attachment is connected at least to the upper or lower side of the planar reinforcing component in a first partial area of the planar reinforcing component,
the planar reinforcing component having at least one aperture from the upper side to the lower side of the planar reinforcing component, the at least one planar attachment covering the at least one aperture, and
a functional component, wherein the functional component or a portion of the functional component is provided in the aperture and is sealed from a wall of the at least one aperture by the attachment material of the planar attachment, wherein the functional component is a hose, feedthrough, or valve.

2. Component according to claim 1, wherein the planar reinforcing component is a plastic, a fiber composite of thermoplastic or thermosetting type, a metal plate or a wooden plate.

3. Component according to claim 1, wherein the attachment material is a thermoplastic injection molding material, or thermoplastic impact extrusion material, or thermosetting impact extrusion material.

4. Component according to claim 1, wherein the at least one planar attachment has an extension which is connected by a material bond and fills the at least one aperture.

5. Component according to claim 1, wherein a length of an overlap area of the at least one planar attachment with the planar reinforcing component is at least 2.0 times, 2.5 times, 3.0 times, 3.5 times, or 4.0 times a wall thickness of the planar reinforcing component.

6. Component according to claim 1, wherein a length of an overlap region of the at least one planar attachment with the planar reinforcing component is at least 2.5 times, 3.0 times, 3.5 times, 4.0 times, or 4.5 times the diameter of the at least one aperture.

7. Component according to claim 1, wherein the at least one planar attachment has a channel connects the planar attachment by a material bond to an edge of the planar reinforcing component in a second subregion of the planar reinforcing component.

8. Component according to claim 7, wherein the channel is bifurcated at least once and a partial channel of each bifurcation is connected to a different attachment in each case.

9. Component according to claim 1, wherein a height of the at least one planar attachment is 0.5 to 1.5 times a wall thickness of the planar reinforcing component.

10. Component according to claim 1, wherein
the component further comprises a planar edge material, wherein a composition of the planar edge material corresponds to the composition of the attachment material, wherein the planar reinforcing component has a first end on a first narrow side and the edge material has a second end divided into two strips on a second narrow side, and the two strips of the second end enclose the first end on both sides in an enclosing region (U).

11. Component according to claim 1, wherein
the component further comprises a planar edge material, comprises at least two planar attachments and at least one of the at least two planar attachments is connected to the upper side of the planar reinforcing component in the first partial region and at least one of the at least two planar attachments is connected to the lower side of the planar reinforcing component in the first or a further partial region.

* * * * *